April 3, 1934.  J. M. MUNSON ET AL  1,953,122
APPARATUS FOR THE MANUFACTURE OF CONTAINERS FROM CELLULOSE SHEETS
Filed Nov. 11, 1929  7 Sheets-Sheet 1

INVENTORS
JOHN M. MUNSON
LOGAN A. BECKER
BY
Ely & Barrow
ATTORNEYS

April 3, 1934.   J. M. MUNSON ET AL   1,953,122
APPARATUS FOR THE MANUFACTURE OF CONTAINERS FROM CELLULOSE SHEETS
Filed Nov. 11, 1929   7 Sheets-Sheet 3

INVENTORS
JOHN M. MUNSON
LOGAN A. BECKER
BY Ely & Barrow
ATTORNEYS

INVENTORS
John M. Munson
Logan A. Becker

BY Ely & Barrow
ATTORNEYS

April 3, 1934.    J. M. MUNSON ET AL    1,953,122
APPARATUS FOR THE MANUFACTURE OF CONTAINERS FROM CELLULOSE SHEETS
Filed Nov. 11, 1929    7 Sheets-Sheet 5

INVENTORS
JOHN M. MUNSON
LOGAN A. BECKER

BY Ely & Barrow

ATTORNEYS

Fig.-13.

Patented Apr. 3, 1934

1,953,122

UNITED STATES PATENT OFFICE 1,953,122

APPARATUS FOR THE MANUFACTURE OF CONTAINERS FROM CELLULOSE SHEETS

John M. Munson and Logan A. Becker, Lakewood, Ohio, assignors, by mesne assignments, to Du Pont Cellophane Company, Inc., New York, N. Y., a corporation of Delaware Application November 11, 1929, Serial No. 406,410

26 Claims. (Cl. 93—18)

The present invention relates to the manufacture of containers from webs or rolls of sheet material and particularly transparent cellulose sheeting. It more particularly relates to the manufacture of long, narrow containers for cigars or the like. The use of transparent wrappers or containers for various articles has become quite extensive as the transparent sheeting protects the article while not interfering with the view thereof, thus giving an added attractiveness and self-selling power to the goods so packaged.

Heretofore many difficulties have been encountered in attempting to form containers from regenerated cellulose sheeting. Such difficulties have been primarily due to the inherent characteristics of the material. The cellulose sheeting employed to make the containers, is light in weight and delicate in texture. While it is tough and capable of resisting strain, it is without grain and tears easily in any direction when the tear or cut has once been started. The surface and transparency of the material may be injured in the manufacture of the containers and special provisions are required to prevent clouding of the material. To render sheet cellulose of this type moistureproof, it is generally coated with a thin transparent layer of a moistureproofing composition. Such a coating upon the cellulose sheet presents other and new difficulties, including bonding and handling of the web in the making of containers therefrom. It has been found advantageous to use heat in bonding the folded portions of the container together and it is one of the problems encountered in dealing with this material to incorporate heat sealing units in an automatic container-forming machine.

It is an object of this invention to produce an apparatus by which containers of sheet cellulose can be rapidly and economically produced.

It is a further object of the invention to continuously form containers directly from rolls of the cellulose sheeting by a fully automatic process and apparatus.

A more particular object of the invention resides in providing automatically operating heat-sealing means on the container forming machine.

The above and other objects of the invention are attained by the apparatus illustrated in the accompanying drawings and described below, it being understood that the invention is not limited to the specific embodiments thereof shown and described.

In the drawings, the numeral 1 indicates a suitable frame or table adapted to support the various elements of the machine. Fixed to the table 1 are extending arms or brackets 2 which, near their ends, removably journal an axle 3 through the agency of pillow blocks 4. A roll 5 of moistureproof cellulose sheeting usually wound on a cardboard tube 6 is carried on the axle 3 and held in position by means of chucks 7 and 8.

Figure 1:
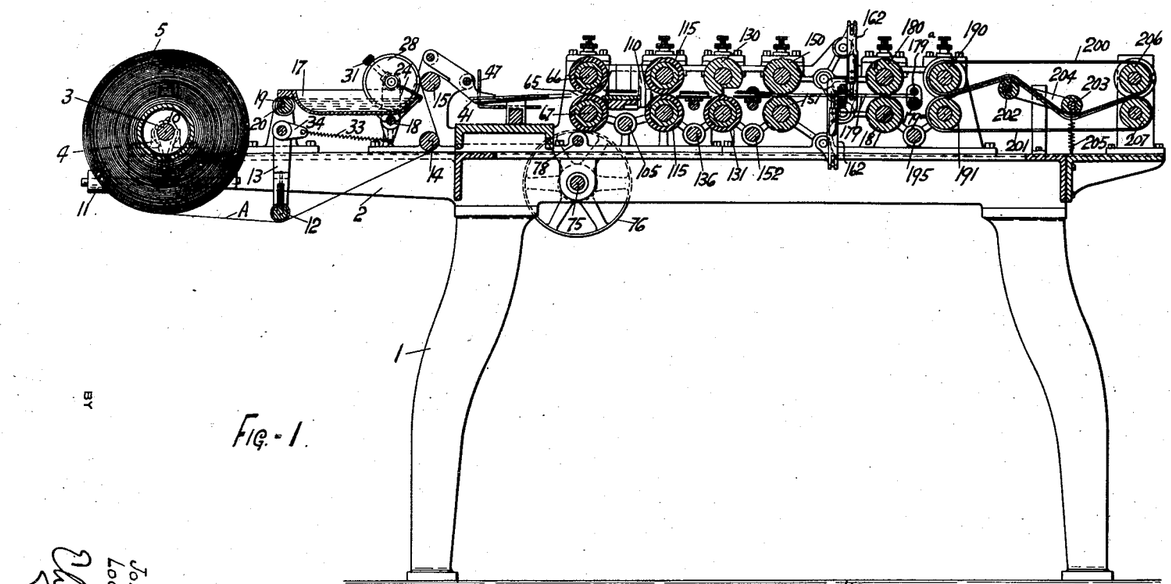
Figure 1 is a longitudinal, vertical sectional view through a complete machine embodying the invention.
Figure 2:
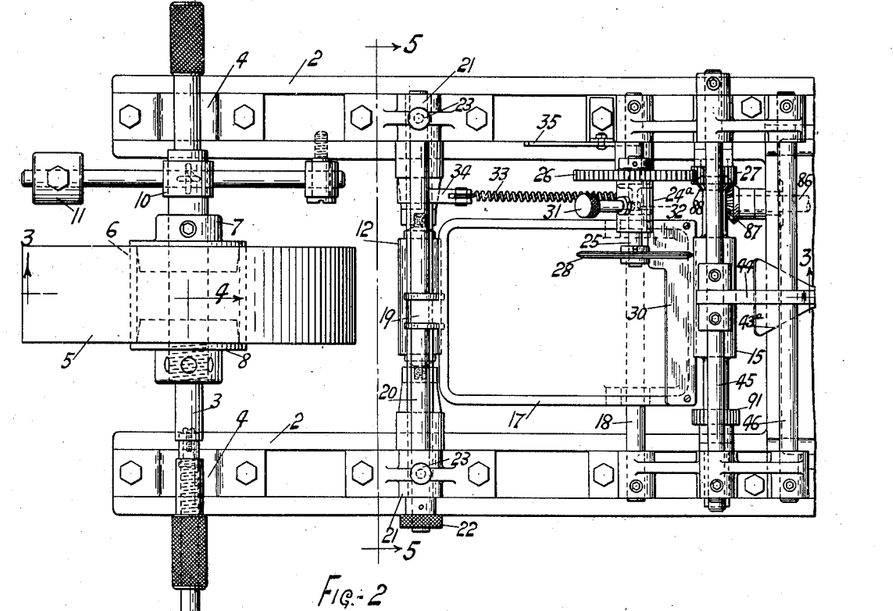
Figure 2 is a plan view on an enlarged scale of the feeding end of the machine.
Figures 3, 4:
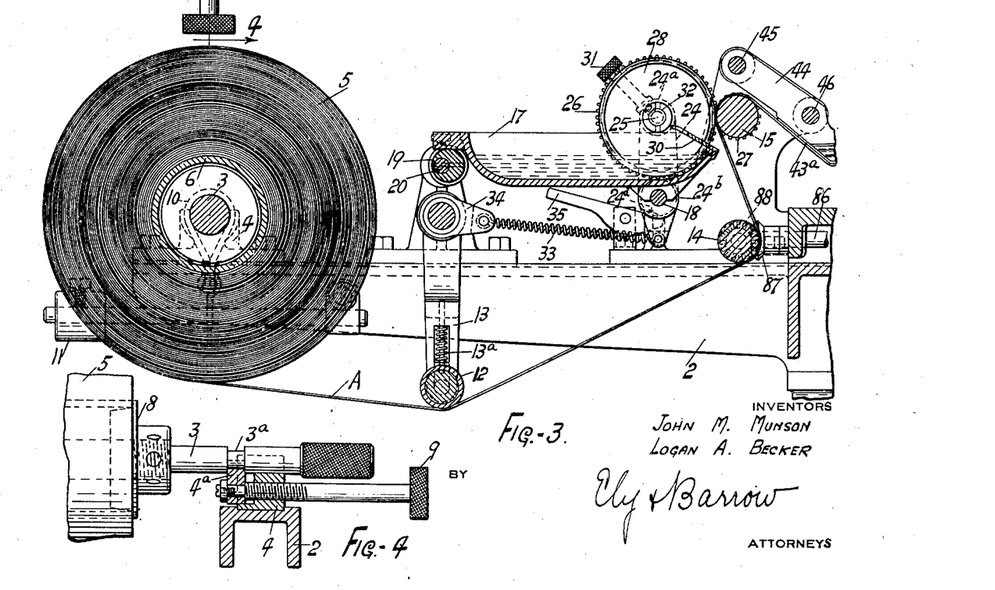
Figure 3 is a vertical sectional view taken on line 3—3 of Figure 2.
Figure 4 is a sectional view taken on line 4—4 of Figure 2.
Figure 5:
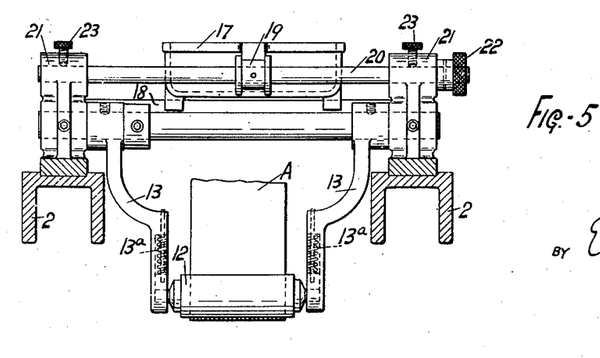
Figure 5 is a transverse sectional view of line 5—5 of Figure 2.
Figure 6:
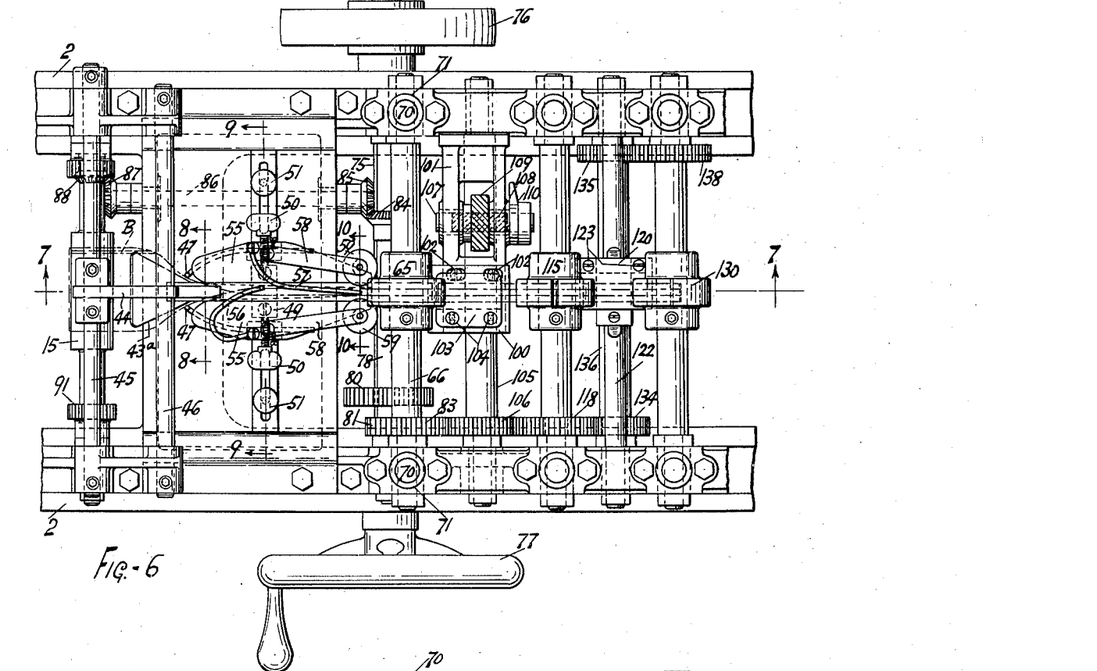
Figure 6 is a plan view on an enlarged scale of the tube forming and cutting means.
Figure 7:
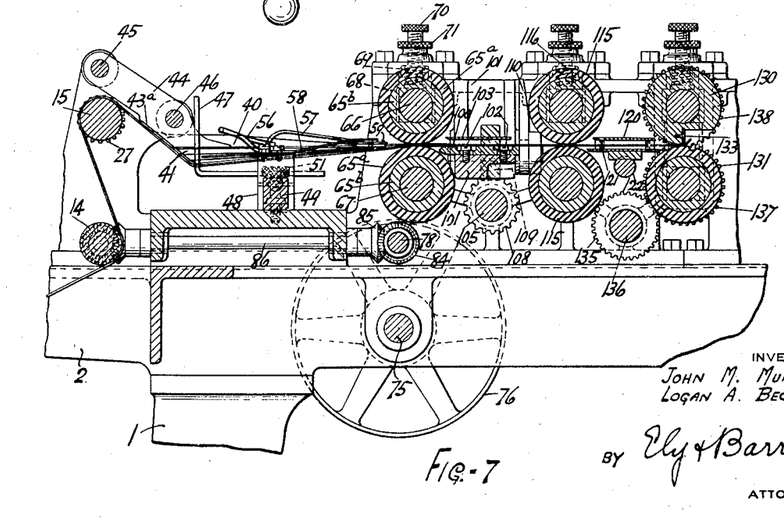
Figure 7 is a vertical sectional view taken on line 7—7 of Figure 6.

As shown in Figure 4, means are normally provided to center the roll and axle in its bearings so that the roll shall be properly located with respect to the machine. Such means may comprise a raised portion 4ª of one of the pillow blocks 4 which is adjustable by means of screw 9 and which engages with an annular channel 3ª in the axle 3.

A light brake 10, having an adjustable weight 11, may be applied to the axle 3 to maintain the proper tension in the drawn strip and to prevent overrunning of the roll.

The web A passes from the roll 5 under a tension roller 12, which is yieldably positioned in arms 13 by springs 13ª, and around lower and upper guide rolls 14 and 15.

As the web passes over the guide roll 15, it receives a narrow strip of gum B at or near one edge. The gum is contained in a pot 17 which is pivotally supported at one end upon a shaft 18 and which rests at the other end upon an eccentric 19 fixed to a shaft 20. The shaft 20 is journaled in bearings 21 and is adapted to be turned by a knob 22 to adjust the eccentric and thus the height of one end of the pot. Set screws 23 are provided in the bearings 21 to lock the shaft 20 and eccentric 19 in the desired position.

A bracket 24 is pivotally supported on shaft 18 through the agency of the enlarged end 24ᵇ and journals a shaft 25 in its upper end bearing 24ª. Fixed to one end of the shaft 25 is a gear 26 which engages with a gear 27 carried on the shaft of the upper guide roll 15. At the other end of the shaft 25 is keyed a gum wheel 28 which is adapted to dip into the pot 17 and which turns in a narrow slot formed in a plate 30 fixed to the end of the pot 17. The upper end 24ª of the bracket 24 is tapped to receive a thumb screw 31 which engages in an annular channel 32 in the shaft 25 to maintain its position in the bracket. The gum wheel 28 is normally urged against the guide roll 15 by suitable means which may include a spring 33 attached between a fixed clip 34 and the lower end of the bracket 24.

The gum wheel 28 and bracket 24 are adapted to be swung about the shaft 18 to an inoperative position, at which position they may be locked by a latch 35 which engages in a notch 24ᵈ in the bracket 24.

From the upper guide roll 15, the web A, having the narrow strip of gum applied thereto, passes below and around a former mandrel 40 on which the tube is folded to form the longitudinal plicated sides of the tube. This mandrel includes a central member 41, upper and lower plates 42 and 43 carried upon a holder 44 fixed to cross-bars 45 and 46. The lower plate 43 is flared rearwardly and upwardly toward the roll 15, as at 43ª, to receive the web A as it is delivered by the roll.

The upper and lower plates are wider than the central member and these parts are so shaped and proportioned as to conform to the shaping of the tube. The progressive shaping of the mandrel to conform to the advancing plicated tube is shown by the several cross-sectional views.

Figure 8:
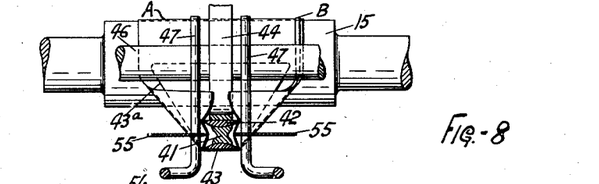
Figure 8 is an enlarged transverse sectional view taken on line 8—8 of Figure 6.

As shown in Figure 8, vertical fingers 47 are provided to fold the edges of the web A about the former 40. The fingers 47 may be adjustably carried by brackets 48 which, in turn, are adjustable in relation to a fixed center block 49 by adjusting screws 50 and locking screws 51. Thin horizontal plates 55 mounted on the brackets 48 opposite the central plane of the former are adapted to cooperate with the central member 41 of the former and with the overhanging edges of the upper and lower plates to form folds at the sides of the web A.

Figure 9:
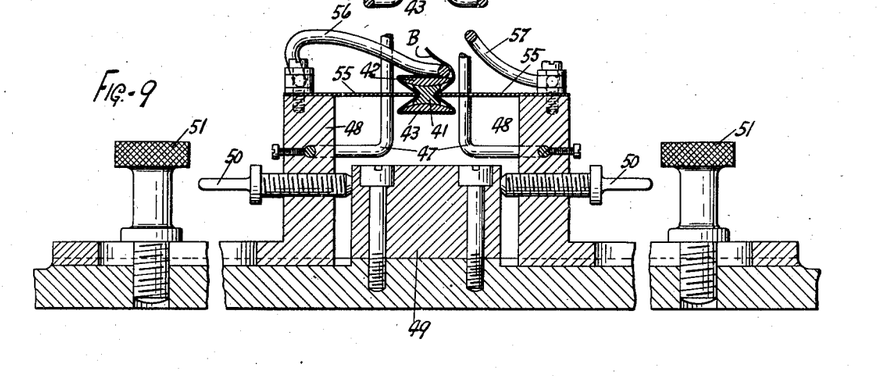
Figure 9 is an enlarged transverse sectional view taken on line 9—9 of Figure 6.
Figure 10:
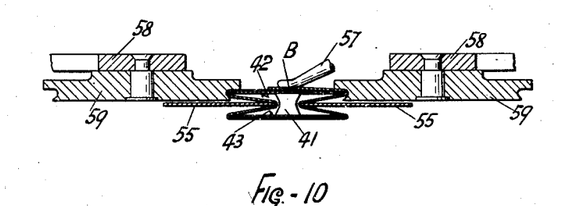
Figure 10 is an enlarged transverse sectional view taken on line 10—10 of Figure 6.
Figure 11:
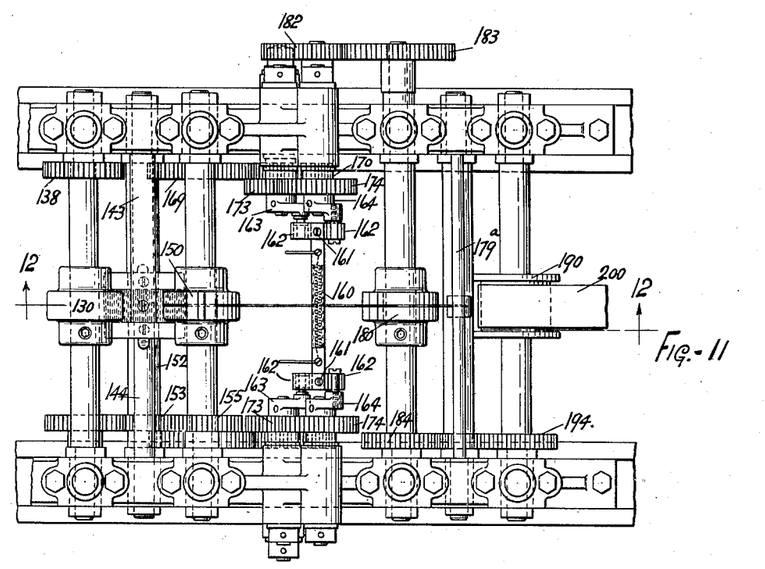
Figure 11 is a plan view on an enlarged scale of the delivery end of the machine showing the heat sealing means.
Figure 12:
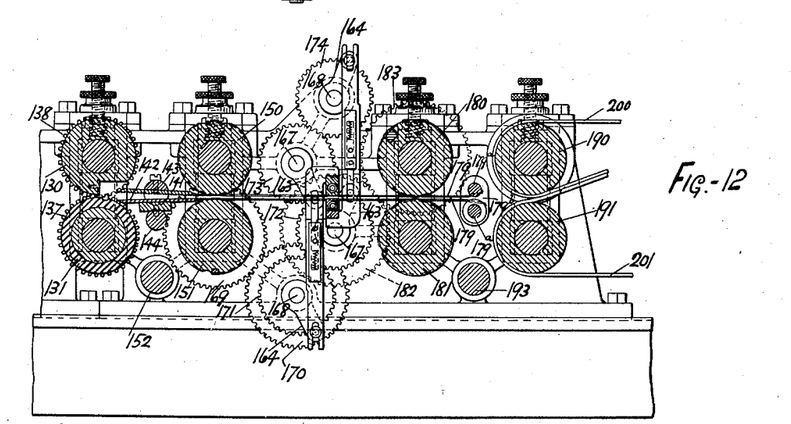
Figure 12 is a vertical sectional view taken on line 12—12 of Figure 11.

One of the brackets 48 adjustably carries a finger 56 which, as shown in Figure 9, is arranged to fold down the ungummed edge of the web A against the former. Carried on the other bracket 48 is a finger 57 which is adapted to engage with the gummed edge of the web, as illustrated in Figure 10, to fold it tightly against the previously folded ungumed edge of the web A.

The brackets 48 preferably also adjustably carry arms 58 which rotatably support flanged rollers 59 at their ends. As seen in Figure 10, the freely rotating rollers 59 bear against the former and crease the web A about the edge of the upper plate 42.

From the former 40 the web, which is now in the form of a tube with bellows-like sides, passes to drawing rolls 65. Each of the drawing rollers in the form shown comprises a rubber outer portion 65ª and a metal hub 65ᵇ. The rollers are mounted on shafts 66 and 67, the bearings of the upper shaft 66 being slidably carried in members 68 and moved toward the lower shaft by springs 69. In order to provide means to control the compression in the springs 69, and thus the compression between the rolls 65, thumb screws 70 and lock nuts 71 are provided.

Figure 17:
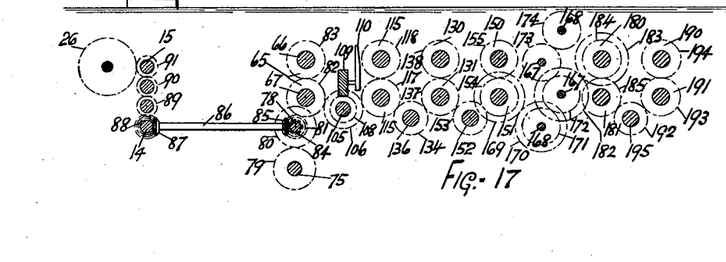
Figure 17 is a diagrammatic view of the drive for the various parts of the machine.

Means for driving the drawing rolls 65 and the various elements of the machine preferably include a main shaft 75 which is journaled in the frame 1 and which is connected, as diagrammatically shown in Figure 17, to the various driven parts of the machine. In order to drive the shaft 75 a pulley 76 is provided at one end thereof, while at the other is a hand wheel 77 for feeding or threading purposes. The main shaft 75 drives an auxiliary shaft 78 through the agency of gears 79 and 80. The rolls 65 are in turn driven from the auxiliary shaft 78 by a pinion 81 and gears 82 and 83. The auxiliary shaft 78 also is adapted to drive the guide rolls 14 and 15 by means of miter gears 84 and 85, shaft 86 and miter gears 87 and 88. A series of gears 89, 90 and 91 drive the upper guide roll from the lower guide roll. As stated heretofore, the upper guide roll shaft carries the gear 27 which drives the gear 26 fixed to the shaft 25 of the gum wheel 28.

After leaving the drawing rolls 65, the web A, which is now in the form of a tube, is cut into lengths or sections C. Suitable means to accomplish this may include an anvil 100 which is adjustably supported on a bracket 101 by machine screws 102. Spaced from the anvil but parallel therewith is a guide plate 103 which is fixed to the anvil on one side by screws 104. A shaft 105 extending below the bracket 101 carries a gear 106 which meshes with the gear 82 on the shaft 67. A shaft 107 journaled in the bracket 101 and driven by spiral gears 108 and 109 from the shaft 105 has fixed to its end a knife 110 adapted to pass across the forward edge of the anvil 100 to sever the tube into the sections C. The speed of rotation of the knife is so timed that the proper lengths of tubing will be cut off.

A pair of feed rolls 115 having a notch 116 in the periphery of the upper roll is adapted to receive the severed lengths C of the tube from the cutter. The circumference of the rolls 115 and subsequent rolls is equal to the length of each of the tube sections C so that one revolution of the rolls will advance a section a distance equal to a cut section of tube and thus maintaining the proper timing in the machine. The notch 116 in the top roll is adapted to engage with the ends of the cut tube sections to prevent the gum B being forced out the ends thereof. The various other pairs of cooperating rolls each have one roll with a notch similar to notch 116 therein. The rolls are driven through gears 117 and 118 which mesh with the gear 106 on the shaft 105.

Figures 14, 15, 16:
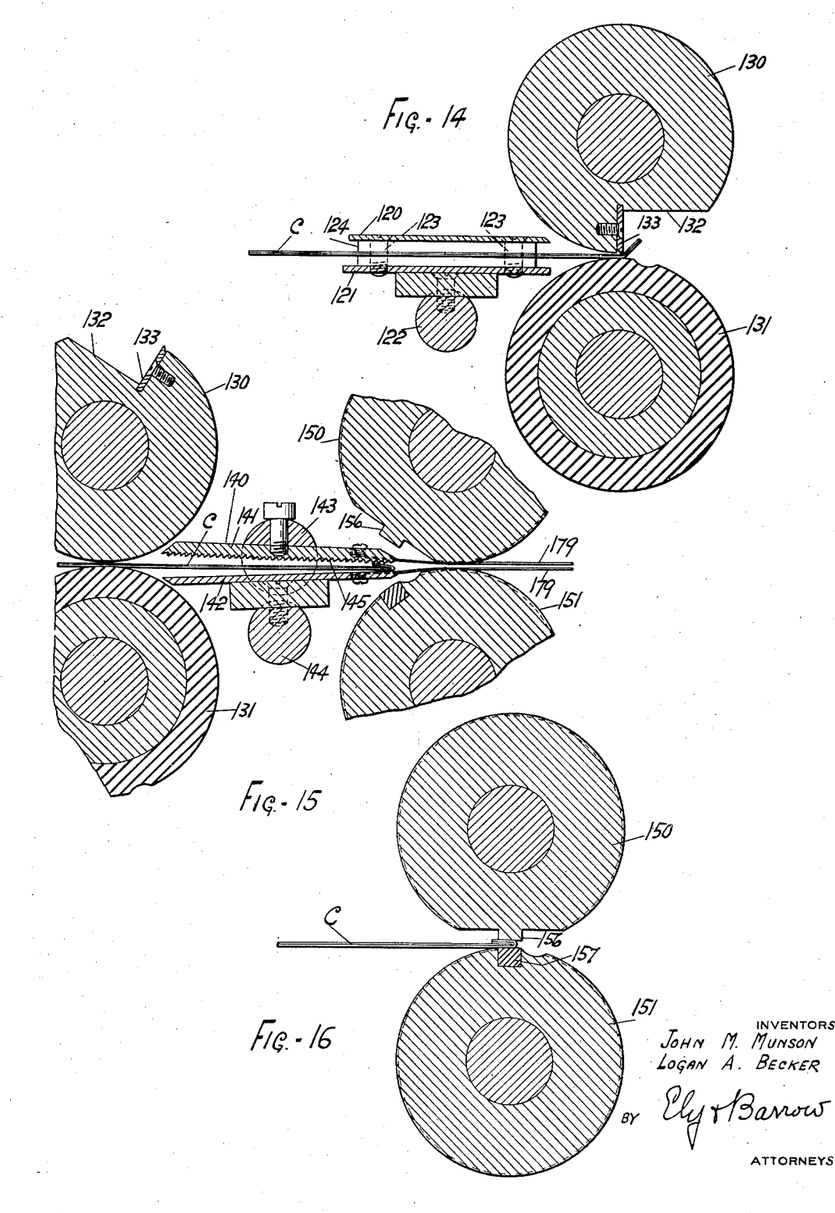
Figure 14 is a detail sectional view of the tube creasing means.
Figure 15 is a detail sectional view of the tube folding means.
Figure 16 is a detail sectional view of the means for ironing down the folded tube end.

From the rolls 115 the tube sections C pass through spaced guide plates 120 and 121 carried on a rod 122. The upper guide plate 120 is fixed by machine screws 123 and a spacer bar 124 to the lower plate 121 on one side only to assist in "threading" the machine. The next step in the formation of the container is the folding of the end over on the tube. This is initiated by a pair of creasing rolls comprising an upper creasing roll 130 and a lower cushion roll 131 which next receive the tube sections C. The lower roll 131 is exactly similar to the lower roll 115 both as to form and mounting, while the upper roll 130 is mounted identically with the rolls 65 and 115. The upper roll 130, preferably of metal, has, however, a cut-away portion 132 adapted to receive a metal blade 133. The edge of the blade 133 extends slightly outside the periphery of the roll 130 and engages with each tube section near the end to form a transverse crease therein, as shown in Figure 14. The rolls 130 and 131 are driven through gears 134 and 135 on an idler shaft 136 to meshing gears 137 and 138 on the shafts of the rolls 130 and 131.

After the blade 133 of the roll 130 has creased the tube C, the end of the tube is bent upwardly. The abutting surfaces of the rolls 130 and 131 feed the tube section C through a folder 140 which comprises upper and lower plates 141 and 142 adjustably carried on a cantilever rod 143 and a rod 144 respectively. The plates are set to converge toward the discharge end and the under face of the upper plate 141 is provided with teeth, as at 145, to catch the creased end of the tube section C so as to fold it over and down against the body portion as shown in Figure 15. In the operation of this folder the teeth may catch both plies of the sheet material simultaneously or successively and as the tube advances the plies are dragged over so that the end of the tube lies close to the body thereof as it leaves the plates.

Ironing down rolls, comprising an upper roll 150 and a lower roll 151, are adapted to receive each tube section C from the folder 140 and give a final squeeze to the fold, as illustrated in Figure 16. The rolls 150 and 151 are mounted similarly to the rolls heretofore described and are driven through the agency of an auxiliary shaft 152 and suitable gearing 153, 154 and 155. The upper roll 150 is preferably formed with a transverse rib 156 and the roll 151 with a rubber pad 157 which are the portions of the rolls that are adapted to engage with the folded end of each tube section C.

Figure 13:
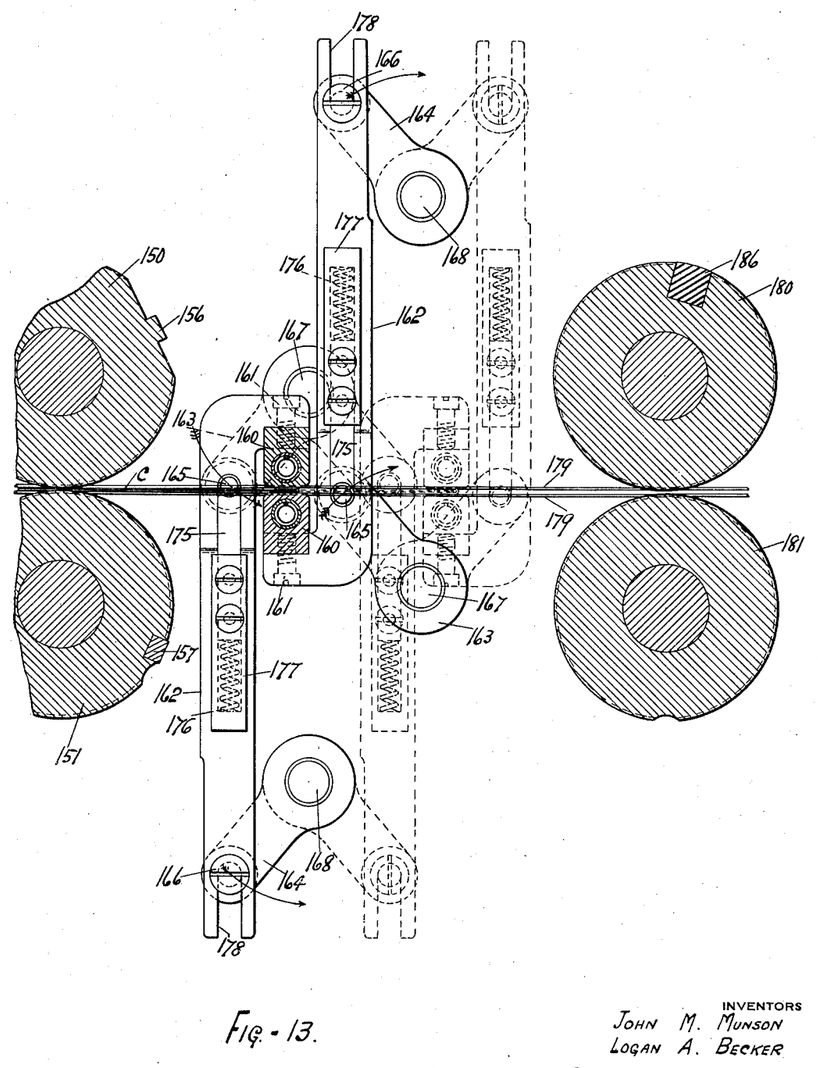
Figure 13 is an enlarged detail view of Figure 12, showing the electrical heating and sealing means.

From the ironing rolls 150 and 151, each tube section C is fed to a heat sealer which is adapted to apply heat and pressure to the ironed down end of each tube section which fuses the coating on the material sufficiently to form an adhesive seal. The heat sealer comprises a pair of electrically heated elements 160 which are arranged to press against opposite sides of the folded end of each tube section, as shown in Figure 13, and which are adapted to travel with each tube section during a portion of its movement so as to secure a tight, permanent seal. The heater elements 160 are mounted similarly but oppositely, therefore the various parts of the upper and lower heater units have been given the same numbers. The ends or sides of each heater element 160 are fixed by machine screws 161 to a pair of carrier bars 162. Each carrier bar 162 is supported by a carrier crank 163 and a guide crank 164 through the agency of a stud axle 165 on the carrier crank and a stud bolt 166 on the guide crank. The carrier cranks and the guide cranks are fixed to stub shafts 167 and 168, respectively, which are rotated by means of suitable gearing 169, 170, 171, 172, 173 and 174.

The two carrier cranks and the two guide cranks of each heater unit are constantly in parallel relation so that the heater elements 160 normally travel in opposite circles about the axis of the carrier crank shafts 167, as shown by the arrows in Figure 13. It will be seen, however, that during a portion of the travel, the heater elements 160 come together on opposite sides of the folded end of the tube section C. In order to allow the cranks to continue their movement and also to obtain a pressing and heating action during a longer portion of the movement of each tube section through the machine, the bearings in the carrier bars 162 for the stud axles 165 of the carrier cranks are made yieldable. To accomplish this the carrier bar 162 may be slotted to receive a bearing bar 175 which is yieldably urged against the stud axle 165 by a spring 176, side plates 177 fixed to either side of the bearing bar 175 being provided to guide the bearing bar and retain the spring 176 in place. The end of the carrier bar which is supported by the guide crank is slotted, as at 178, to allow the stud bolt 166 of the guide crank 164 to slide therein for the above reasons. It will thus be seen that the carrier and guide cranks can be continuously rotated and that the heater elements 160 will press down on opposite sides of the folded end of each tube section C and that the heater elements will travel in this position along with the tube section until the dotted line position of Figure 13 is reached, at which time the heater elements will draw apart and swing above and below the tube section in opposite circles until they again meet together on the folded end of the next tube section. The timing is so arranged that the heater elements during the period they are in contact travel at the same speed as the tube, and the dwell is sufficient to melt the coating and form the adhesive seal. In order to support and guide the tube section during this operation, fine wires 179 may be provided above and below the tube, which support the tube but do not interfere with the action of the sealing means. These wires are set in and attached to the ends of the plates 141 and 142 at one end and to rods 179$^a$ located in a bracket 179$^b$ beyond the next feeding rolls. The rolls and heaters are notched or grooved for the reception of the wires.

As the tube section C leaves the heat sealer, it is preferably received by a pair of rolls 180 and 181 which are constantly driven by gears 182, 183, 184 and 185. The rolls 180 and 181 are of metal and are mounted similarly to the rolls described heretofore. The upper roll 180 may be provided with a rubber insert 186 adapted to engage with the heat sealed end of the tube section to give a uniform, sure yielding pressing action thereto. This action not only serves to hold the end of the tube section against the body during the cooling of the seal, but also causes the lower metal roll 181 to absorb the heat of the seal.

It has been found desirable to give a final pressure to the completed and sealed tube before its discharge, and for this purpose there is arranged a pair of belts 200 and 201 which have their lower and upper runs, respectively, in contact to receive the finished tube. The belts pass over the rolls 190 and 191, one of which is flanged. These rolls are driven by means of gears 192, 193 and 194 and an auxiliary shaft 195. The belts may be conducted over a pair of idler pulleys 202 and 203 on the pivoted arm 204, a spring 205 keeping the belt under tension and imparting a circuitous path to the belt. At the discharge end of the machine the belts pass over the idlers 206 and 207. By passing the belts in circuitous paths as shown, the tubes are firmly pressed and ironed together.

Figure 18:
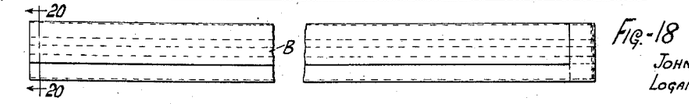
Figure 18 is a plan view of a finished container made by the machine.
Figures 19, 20:
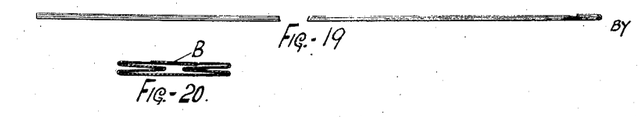
Figure 19 is a side elevation of the container of Figure 18.
Figure 20 is an enlarged transverse sectional view taken on line 20—20 of Figure 18.

The finished container is shown in Figures 18, 19 and 20, from which it will be apparent that the container, while formed flat, can be readily opened or expanded to receive any desired article, such as a cigar or the like. The one end of the body of the container is permanently and securely sealed. The other end is open to receive the article after which it may be closed as desired, thus providing a transparent, protective cover to the article so packaged.

In "threading" the machine, the axle 3 is lifted off the pillow blocks 4 and the chuck 8 removed. A roll of material 5 is now placed on the axle 3 and the flange 8 is run down against it. The axle and roll are returned to the machine and the tensioning brake 10 is applied. The gum wheel 28 is now tipped back to the inoperative position where it is locked by the latch 35. The web A of the roll 5 is now passed under the tension roll 12 and around the upper and lower guide rolls 14 and 15. The web is then worked around the former 40 and the various fingers thereof to the drawing rolls 65. Now by turning the handwheel 77 fixed to the main drive shaft 75, the web can be drawn slowly through the machine. It is obvious that the various fingers and wheels of the former 40 can be moved back to some extent to assist in "threading" the web therethrough. Then as the hand wheel 77 is turned to draw the web slowly through the machine, the various fingers and wheels of the former can be adjusted to proper working position.

The machine can now be constantly driven by any suitable means through the agency of the pulley 76 attached to the main drive shaft 75. The gum wheel 28 is dropped back into operative position by releasing the latch 35 and the screw 9 is adjusted to properly center the roll and web in the machine. By means of the knob 22 the position of the eccentric 19 is adjusted, and thus the position of the gum pot 17 and the clearance between the gum wheel 28 and the scraper plate 30 are adjusted so that a thin, uniform strip B of gum is applied to the web A.

The operation of the machine is believed to be apparent from the foregoing description. However, a brief résumé of the operation follows:

The web A drawn from the roll 5 receives a thin strip of gum B from the gum wheel 28, after which it is formed into a tube by the former 40. The rolls 65 draw the tube from the former 40, which gives the plicated form to the tube, and feed it into the anvil 100 where it is cut into sections C by the rotating knife 110. The pick-up rolls 115 then carry the tube section C through the creasing rolls 130 and 131 which crease the end of the section so that on passing through the folder 140, the creased end is folded over and against the body of the tube. The creased end of the tube section C is then ironed down by the rolls 150 and 151, after which the heat sealer presses on either side of the creased end and moves with the tube section to securely seal the end thereof. The fusible coating on the two faces of the sheet will be melted and will seal the end in place and also seal the surfaces of the tube together, making an air-tight seal. The tube section then passes to the rolls 180 and 181 which hold the sealed end together while cooling and thence to final pressure and the discharge belts 200 and 201.

While the invention is particularly adapted for the manufacture of long, narrow containers, the principles of the invention may be extended to the manufacture of envelopes, wrappers and containers of all sorts. It will also be evident that certain features of the invention and the method and apparatus for forming the containers may be extended to the manufacture of the containers from other materials than cellulose sheeting, and insofar as such features are concerned the invention is not necessarily limited to operation thereupon. Moreover, it will be apparent that the invention is not limited to the exact details shown and described. Accordingly, various applications or modifications of the invention can be resorted to without departing from the spirit of the invention or the scope of the appended claims.

What is claimed is:

1. A machine for the manufacture of containers from a length of tube comprising means to form a transverse crease in the end of a length of tube, a detent adapted to catch the folded end of the tube and move it toward the body thereof in its passage through the machine, and means to apply heat and pressure to the folded end of the tube.

2. In a machine for making containers or the like, means to support a roll of web material, means to apply a strip of adhesive along an edge of said web, means to continuously fold said web into a tube and to simultaneously fold the sides of the tube inwardly to form a plicated tube, means to sever said continuously moving tube into sections, means for continuously moving said sections, means adapted to form a transverse crease in turn in each moving section adjacent to one end thereof, means to fold the creased ends of the sections in turn back upon the body portion, means to iron down in turn the folded ends of the moving sections, means adapted to apply heat and pressure on either side of said folded ends of the moving sections, said means being adapted to move with each section through a portion of its travel, and means adapted to press in turn the heat sealed end of each moving section together during the cooling thereof.

3. In a machine for making containers or the like, means to support a roll of web material, means to apply a strip of adhesive along an edge of said web, means to continuously fold said web into a tube and to simultaneously fold the sides of the tube inwardly to form a plicated tube, means to sever said continuously moving tube into sections, means for continuously moving said sections, means adapted to form a transverse crease in turn in each moving section adjacent to one end thereof, means to fold the creased ends of the sections in turn back upon the body portion, means adapted to apply heat and pressure on either side of said folded ends of the moving sections, said means being adapted to move with each section through a portion of its travel, and means adapted to press in turn the heat sealed end of each moving section together during the cooling thereof.

4. In a machine for making containers or the like, means to support a roll of web material, means to apply a strip of adhesive along an edge of said web, means to continuously fold said web into a tube and to simultaneously fold the sides of the tube inwardly to form a plicated tube, means to sever said continuously moving tube into sections, means for continuously moving said sections, means adapted to form a transverse crease in turn in each moving section adjacent to one end thereof, means to fold the creased ends of the sections in turn back upon the body portion, means to iron down in turn the folded ends of the moving sections, and means adapted to apply heat and pressure on either side of said folded ends of the moving sections, said means being adapted to move with each section through a portion of its travel.

5. In a machine for making containers or the like, means to support a roll of web material, means to apply a strip of adhesive along an edge of said web, means to continuously fold said web into a tube and to simultaneously fold the sides of the tube inwardly to form a plicated tube, means to sever said continuously moving tube into sections, means for continuously moving said sections, means adapted to form a transverse crease in turn in each moving section adjacent to one end thereof, means to fold the creased ends of the sections in turn back upon the body portion, and means adapted to apply heat and pressure on either side of said folded ends of the moving sections, said means being adapted to move with each section through a portion of its travel.

6. In an apparatus for forming containers from sheet material having a fusible coating, means for forming a tube and means for sealing the surfaces of the tube together comprising a heating element adapted to bear against the tube and move with the tube in its passage through the machine.

7. In an apparatus for forming containers from transparent regenerated cellulose sheeting having a fusible coating, means for forming lengths of tubing from said sheeting, means for folding an end of a length of tubing against the side thereof, and means adapted to apply heat and pressure to the folded end to cause it to adhere to the side of the tubing.

8. In an apparatus for forming containers from sheet material having a fusible coating, means for forming a tube, means for sealing the surfaces of the tube together comprising a heating element adapted to bear against the tube and move with the tube in its passage through the machine, and means for holding the sealed area of the tube together during cooling.

9. In an apparatus for forming containers from transparent regenerated cellulose sheeting having a fusible coating, means for forming lengths of tubing from said sheet, means for folding an end of a length of tubing against the side thereof, and means adapted to apply heat and pressure to the folded end to seal the folded end and cause it to adhere to the side of the tubing.

10. In apparatus for forming containers or the like from continuous webs of material having a fusible coating, means for continuously moving the web, means for forming a tube from said web, means for periodically severing said tube into sections, a pair of rolls adapted to receive the sections in turn from the cutting means, one of said rolls being resiliently surfaced, the other of said rolls having a recess in the periphery thereof, said recess having a radially extending side, a blade fixed to the radially extending side of said roll recess, said blade being adapted to cooperate with the resilient surface of the mating roll to form a crease adjacent the end of each tube section, means to fold said creased end of each section over against the body portion thereof, and means to melt the coating to seal the folded end in place.

11. In apparatus for forming containers or the like from continuous webs of material having a fusible coating, means for forming a tube from said web, means for severing said tube into sections, a pair of rolls adapted to receive the sections in turn from the cutting means, one of said rolls being resiliently surfaced, the other of said rolls having a recess in the periphery thereof, said recess having a radially extending side, a blade fixed to the radially extending side of said roll recess, said blade being adapted to cooperate with the resilient surface of the mating roll to form a crease adjacent the end of each tube section, means to fold said creased end of each section over against the body portion thereof, and means to melt the coating to seal the folded end in place.

12. In apparatus for forming containers or the like from continuous webs of material having a fusible coating, means for forming a tube from said web, means for severing said tube into sections, a pair of rolls adapted to receive the sections in turn from the cutting means, one of said rolls being resiliently surfaced, the other of said rolls having a recess in the periphery thereof, a blade fixed in said roll recess, said blade being adapted to cooperate with the resilient surface of the mating roll to form a crease adjacent the end of each tube section, means to fold said creased end of each section over against the body portion thereof, and means to melt the coating to seal the folded end in place.

13. In apparatus for forming containers or the like from continuous webs of material having a fusible coating, means for forming a tube from said web, means for periodically severing said tube into sections, means for forming a transverse crease adjacent to the end of each section, means for folding the creased end of each section over and against the body portion thereof, said means comprising a pair of rearwardly converging plates between which the sections are passed in turn creased end first, the surface of the plate on the side of the crease being toothed to catch the bent creased end of each section which together with the converging of the plates causes the creased end to be bent over and back against the body portion, and means to apply heat and pressure to the folded end.

14. In apparatus for forming containers or the like from flat tube sections of material having a fusible coating, means for forming a transverse crease adjacent to the end of each section, means for folding the creased end of each section over and against the body portion thereof, said means comprising a pair of rearwardly converging plates between which the sections are passed creased end first, the surface of the plate on the side of the crease being toothed to catch the bent creased end of each section which together with the converging of the plates causes the creased end to be bent over and back against the body portion, and means to apply heat and pressure to the folded end.

15. In apparatus for forming containers or the like from continuous webs of material, means for forming a tube from said web, means for periodically severing said tube into sections, means for forming a transverse crease adjacent to the end of each section, means for folding the creased end of each section over and against the body portion thereof, means adapted to carry a pair of electrical heating elements in opposite paths above and below the line of movement of said tube sections, said oppositely moving heating elements being arranged to clamp during an arc in their circular movement on either side of the folded end of each tube section in turn, and resilient means attaching said heating elements to said carrier means to allow said carrier means to continue their movement in a circle after clamping while the clamped heating elements move along with the tube section in the line of movement thereof until the further rotation of the carrier means again moves them apart and in opposite circular paths.

16. In apparatus for forming containers or the like from continuous webs of material, means for forming a tube from said web, means for periodically severing said tube into sections, means for forming a transverse crease adjacent to the end of each section, means for folding the creased end of each section over and against the body portion thereof, a pair of heating elements, and means resiliently carrying said heating elements in oppositely moving overlapping superimposed paths so that the heating elements normally move in opposite circular paths but during a portion of their travel come together on opposite sides of the folded end of each tube section and travel therewith whereby a tight permanent seal is secured.

17. In apparatus for forming containers or the like from continuous webs of material, means for forming a tube from said web, means for periodically severing said tube into sections, means for forming a transverse crease adjacent to the end of each section, means for folding the creased end of each section over and against the body portion thereof, a pair of heating elements, and means resiliently carrying said heating elements in oppositely moving overlapping superimposed paths so that the heating elements normally move in opposite circular paths but during a portion of their travel come together on opposite sides of the folded end of each tube section and travel therewith in a straight line whereby a tight permanent seal is secured, said means for carrying said heater elements being driven in synchronism with the various other parts of the apparatus.

18. In a machine for making containers for cigars or the like, means to support a roll of web material, means to fold the web and to simultaneously fold the sides of the tube inwardly to form a plicated tube, means to sever the tube into sections, means to form a transverse crease in each section adjacent to one end thereof, a folding device to fold the end of the tube over toward the body of the tube along the crease, and a heated member movable against the folded end of the tube.

19. In a machine for making tubular wrappers for cigars, means to form a tube from a moisture-proofed transparent regenerated cellulose sheeting, means to place longitudinal plicated folds in the sides of the tube, means to crease the tube transversely, a device for folding the end of the tube along the transverse crease, and means for applying heat and pressure to the folded end of the tube.

20. In a machine for making empty tubular wrappers for cigars from moisture-proofed transparent regenerated cellulose sheeting, means to shape the sheeting into tubular form, means to form longitudinal plicated folds in sides of the tube, means to crease the end of the tube transversely, a device for folding the end of the tube along the transverse crease and against one face of the tube, and means for applying heat and pressure to the folded end to seal it against the face of the tube.

21. In a machine for making empty tubular wrappers for cigars from moisture-proofed transparent regenerated cellulose sheeting, means to shape the sheeting into tubular form, means to form longitudinal plicated folds in sides of the tube, a device for folding the end of the tube transversely, and means to apply pressure to the folded end of the tube whereby the tube is sealed through the medium of the moisture-proof coating.

22. In a machine for making empty tubular wrappers for cigars from moisture-proofed transparent regenerated cellulose sheeting, means to shape the sheeting into tubular form, means to form longitudinal plicated folds in sides of the tube, means for severing the tube into individual lengths, a device for folding the end of the tube transversely, and means to apply heat and pressure to the folded end of the tube.

23. In a machine for making tubular wrappers for cigars from moisture-proofed transparent regenerated cellulose sheeting, means to shape the sheeting into tubular form, means to form longitudinal plicated folds in sides of the tube, means for folding the end of the tube transversely against one face thereof, and means to seal the folded end and cause it to adhere to the face of the tube by the medium of the moisture-proof coating.

24. In an apparatus for forming empty containers or the like from a web of transparent regenerated cellulose having a moisture-proof coating thereon, means for advancing the web, means for forming an empty flattened tube of predetermined length from said web, and means for applying pressure to the end of the tube to seal it through the medium of the moisture-proof coating.

25. In an apparatus for forming empty containers or the like from a web of transparent regenerated cellulose having a moisture-proof coating thereon, means for advancing the web, means for forming a tube of predetermined length from said web, creasing means to fold the end of the tube, and means for applying pressure to the end of the tube to seal it through the medium of the moisture-proof coating.

26. In an apparatus for forming empty containers or the like from a web of transparent regenerated cellulose having a moisture-proof coating thereon, means for advancing the web, means for forming a tube of predetermined length from said web, creasing means to fold the end of the tube and bring it in contact with a side of the tube, and means for applying pressure to the end of the tube to seal it and cause it to adhere to the side of the tube through the medium of the moisture-proof coating.

JOHN M. MUNSON.
LOGAN A. BECKER.